United States Patent
Furukado

(10) Patent No.: US 7,809,191 B2
(45) Date of Patent: Oct. 5, 2010

(54) IMAGE PROCESSING SYSTEM AND IMAGE PROCESSING METHOD FOR AERIAL PHOTOGRAPH

(75) Inventor: Kazuhiro Furukado, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 927 days.

(21) Appl. No.: 11/656,002

(22) Filed: Jan. 22, 2007

(65) Prior Publication Data

US 2007/0195089 A1    Aug. 23, 2007

(30) Foreign Application Priority Data

Feb. 17, 2006    (JP)    ............... 2006-040531

(51) Int. Cl.
G06K 9/34    (2006.01)
G06K 9/40    (2006.01)
G06K 9/20    (2006.01)
G06K 9/36    (2006.01)

(52) U.S. Cl. .................. 382/174; 382/274; 382/282; 348/143

(58) Field of Classification Search .......... 382/100, 382/106, 108, 113, 174, 199, 203, 204, 274, 382/282; 348/143–160
See application file for complete search history.

(56) References Cited

U.S. PATENT DOCUMENTS

| | | | | |
|---|---|---|---|---|
| 4,873,651 A * | 10/1989 | Raviv | .................. | 700/259 |
| 5,943,164 A * | 8/1999 | Rao | .................. | 359/462 |
| 5,986,763 A * | 11/1999 | Inoue | .................. | 356/613 |
| 6,177,682 B1 * | 1/2001 | Bartulovic et al. | ..... | 250/559.44 |
| 6,671,349 B1 * | 12/2003 | Griffith | .................. | 378/163 |
| 7,376,284 B2 * | 5/2008 | Tao et al. | .................. | 382/285 |
| 7,733,342 B2 * | 6/2010 | Kim et al. | .................. | 345/426 |

(Continued)

FOREIGN PATENT DOCUMENTS

JP    06-105224    4/1994

(Continued)

OTHER PUBLICATIONS

Irvin et al., "Methods for Exploiting the Relationship Between Buildings and Their Shadows in Aerial Imagery", Nov./Dec. 1989, IEEE Transactions on Systems, Man, and Cybernetics, vol. 19, No. 6, pp. 1564-1575.*

(Continued)

Primary Examiner—Aaron W Carter
(74) Attorney, Agent, or Firm—Nixon & Vanderhye P.C.

(57) ABSTRACT

In order to increase the recognition rate of a shadow area contained in the image of an aerial photograph, a central control portion performs the processes of: comparing a shadow-produced angle with the angles of segments constituting the polygons generated by a polygon-generating portion to judge whether or not there are the segments coinciding with the shadow-produced angle, of the segments constituting the polygon; judging whether or not the ratio of the length of the segment constituting the shadow to the length of the segment constituting the feature coincides with a shadow-extended ratio; judging whether or not the color tone of the area surrounded by the segments constituting the shadow is darker than that of all the adjacent polygons; and identifying the area surrounded by the segments constituting the shadow as "shadow area." The polygon of the identified shadow area is generated.

4 Claims, 12 Drawing Sheets

U.S. PATENT DOCUMENTS

| | | | |
|---|---|---|---|
| 2006/0282777 A1* | 12/2006 | Gallafent et al. | 715/726 |
| 2007/0041008 A1* | 2/2007 | Aufmuth et al. | 356/237.2 |
| 2007/0115284 A1* | 5/2007 | Kim et al. | 345/426 |
| 2007/0195089 A1* | 8/2007 | Furukado | 345/426 |
| 2008/0089610 A1* | 4/2008 | Tao et al. | 382/285 |
| 2008/0310756 A1* | 12/2008 | Tao et al. | 382/285 |
| 2009/0316953 A1* | 12/2009 | Ezekiel et al. | 382/103 |

FOREIGN PATENT DOCUMENTS

| | | |
|---|---|---|
| JP | 11-283012 | 10/1999 |
| JP | 2004-252213 | 9/2004 |

OTHER PUBLICATIONS

"Technique for Mapping" in Computer Mapping; Sakauchi et al., Shokodo Press, 1992, pp. 45-50 (e.g., see p. 2 of specification).

* cited by examiner

[FIG.1]
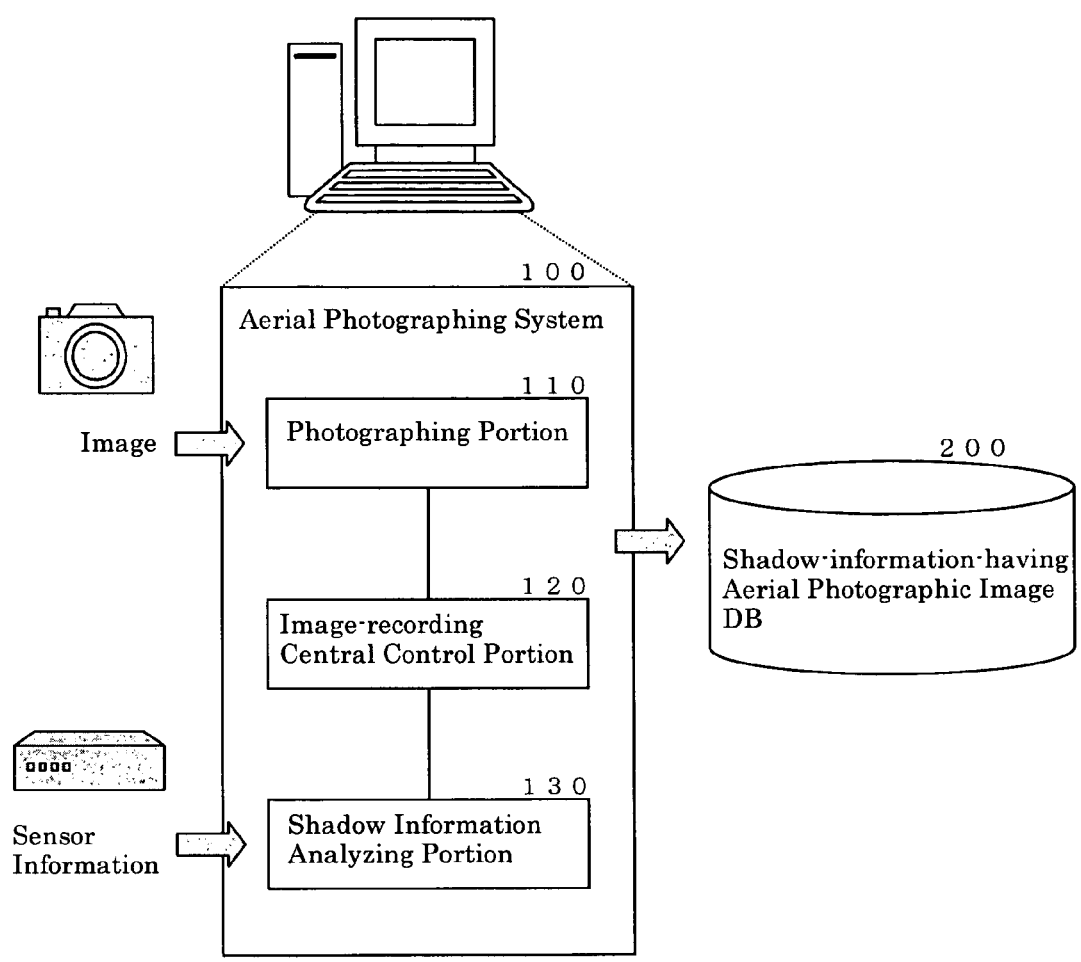

[FIG.2]
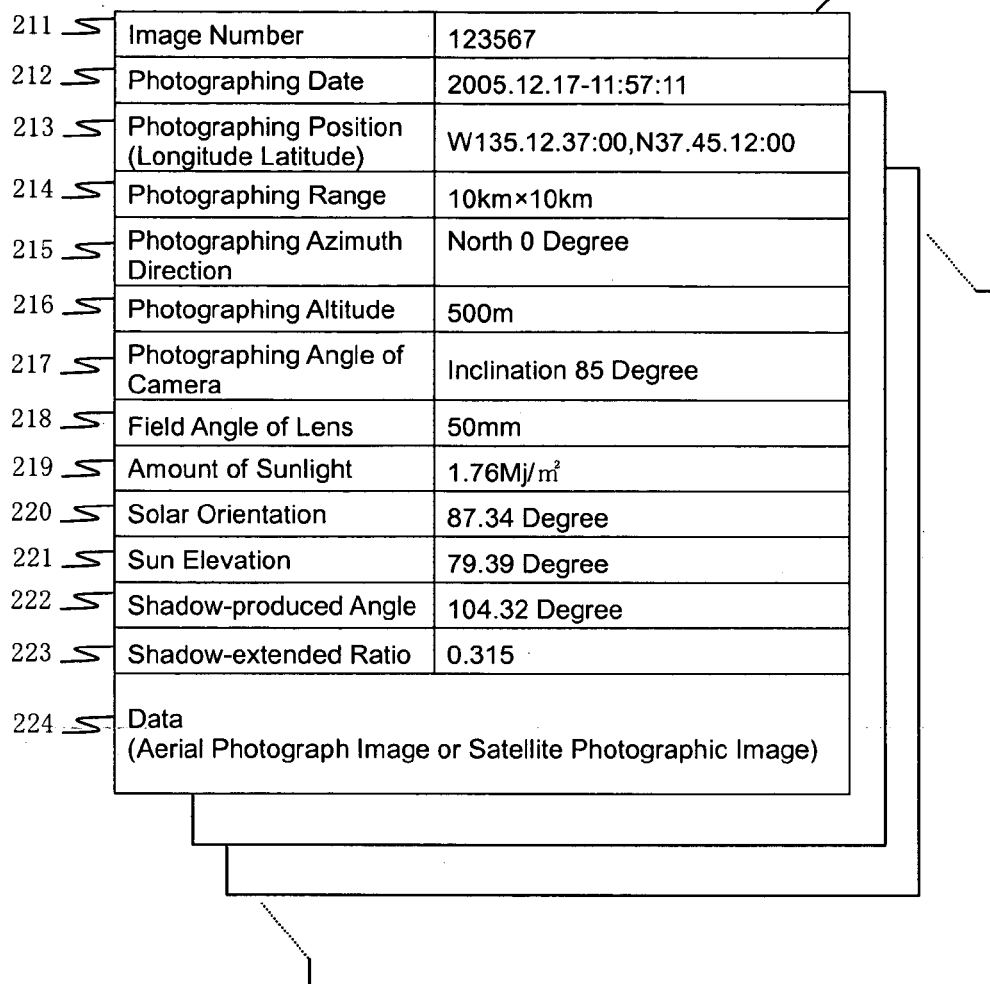

[FIG.3A]
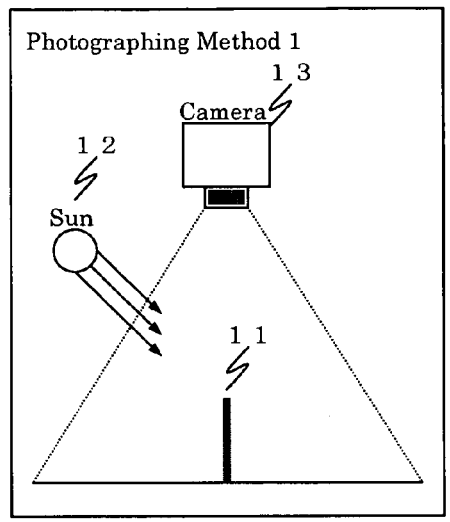
[FIG.3B]
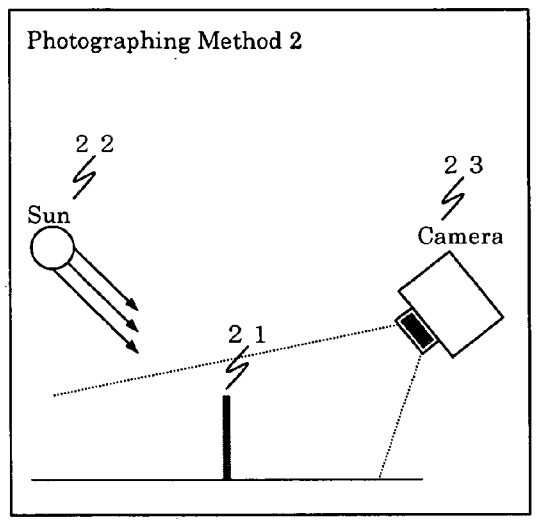
[FIG.3C]
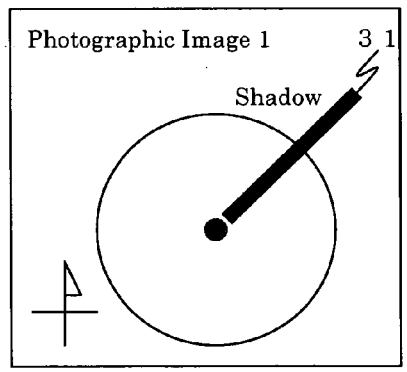
[FIG.3D]
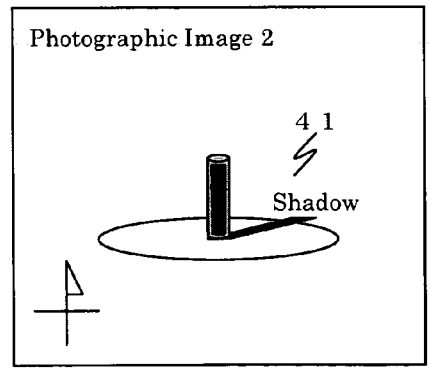
[FIG.3E]
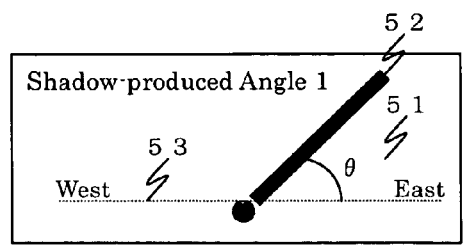
[FIG.3F]
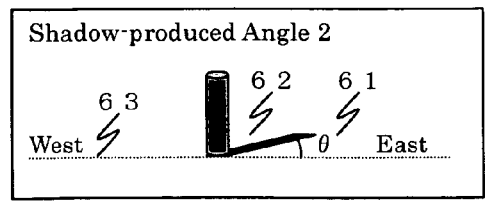

[FIG.4A]
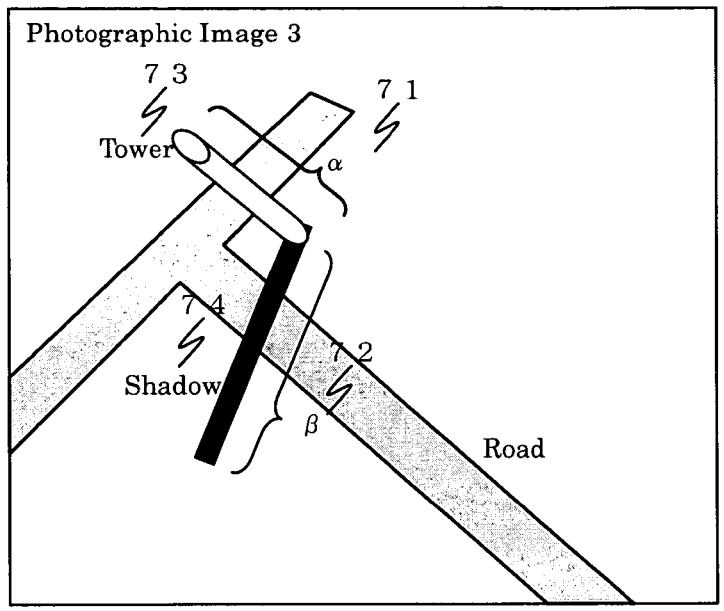
[FIG.4B]
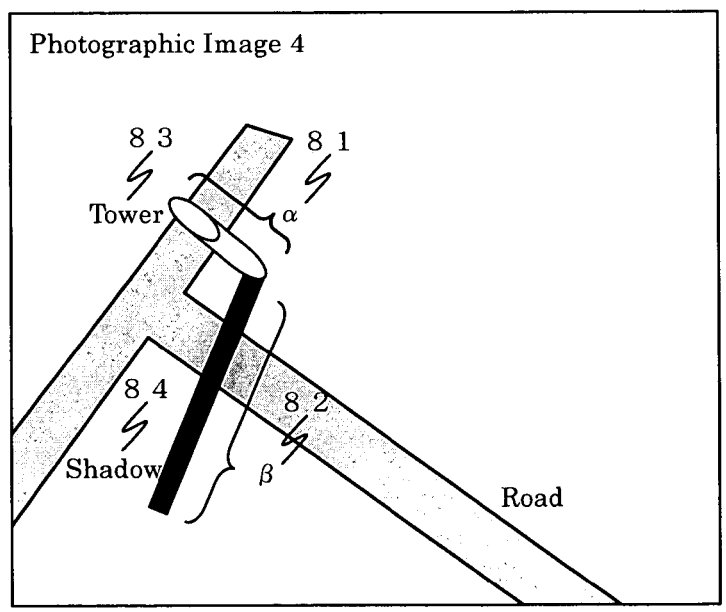

[FIG.5A]
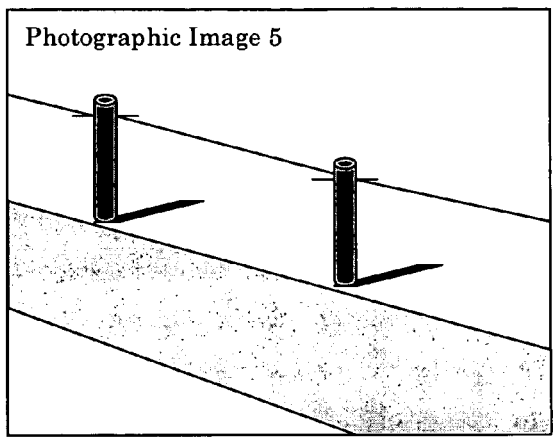
[FIG.5B]
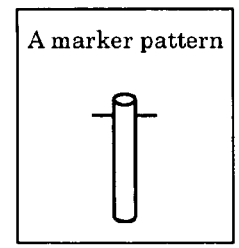
[FIG.5C]
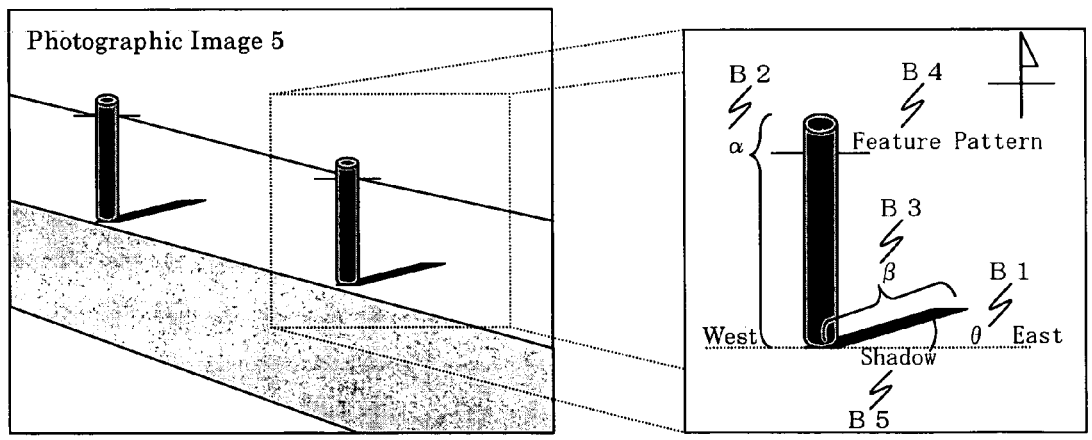

[FIG.6]
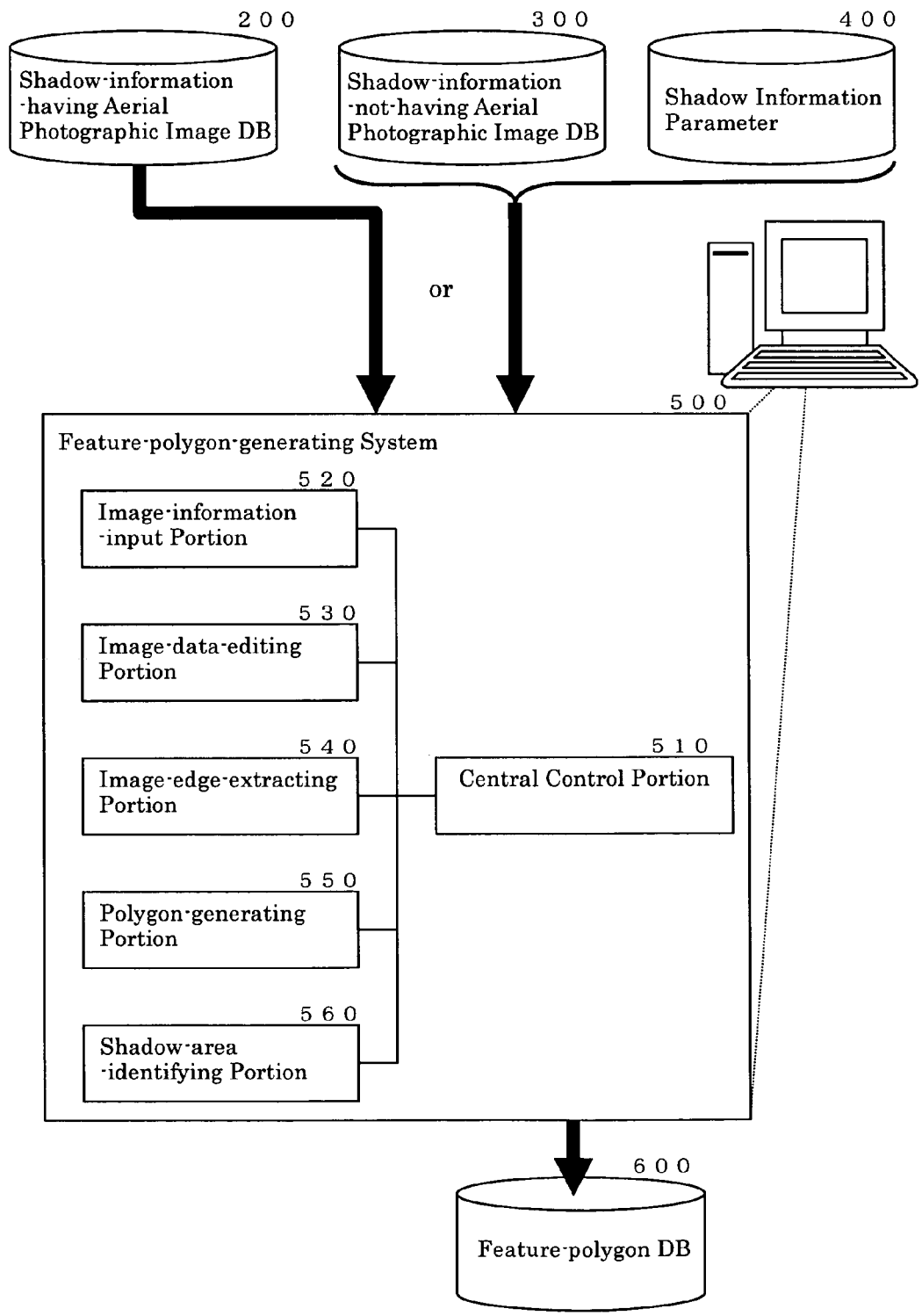

[FIG.7A]

Shadow-information-not-having Aerial Photographic Image DB

| | | |
|---|---|---|
| 611 | Image Number | 123567 |
| 612 | Photographing Date | 2005.12.17-11:57:11 |
| 613 | Photographing Position (Longitude Latitude) | W135.12.37:00,N37.45.12:00 |
| 614 | Photographing Range | 10km×10km |
| 615 | Photographing Azimuth Direction | North 0 Degree |
| 616 | Photographing Altitude | 500m |
| 617 | Data (Aerial Photograph image or Satellite Photographic Image) | |

[FIG.7B]

Shadow Information Parameter

| | | |
|---|---|---|
| 621 | Shadow-produced Angle | 104.32 Degree |
| 622 | Shadow-extended Ratio | 0.315 |

[FIG.7C]

Feature-polygon DB

| | | |
|---|---|---|
| 631 | Image Number | 123567 |
| 632 | Photographing Date | 2005.12.17-11:57:11 |
| 633 | Photographing position (Longitude Latitude) | W135.12.37:00,N37.45.12:00 |
| 634 | Number of Polygon | 745 |
| 635 | Polygon Data (Latitude-longitude Coordinate Point Sequence) | |

[FIG.8A]
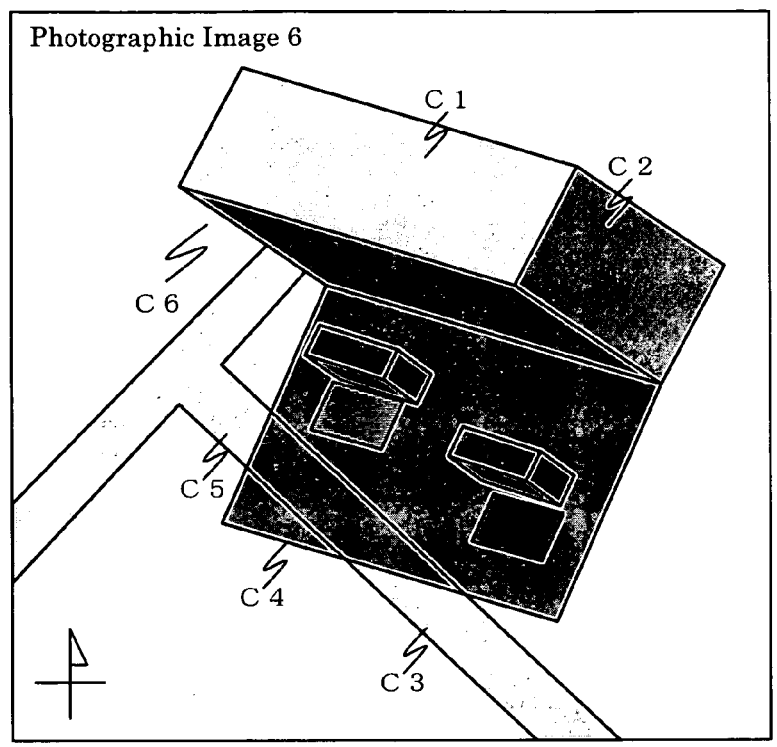
[FIG.8B]
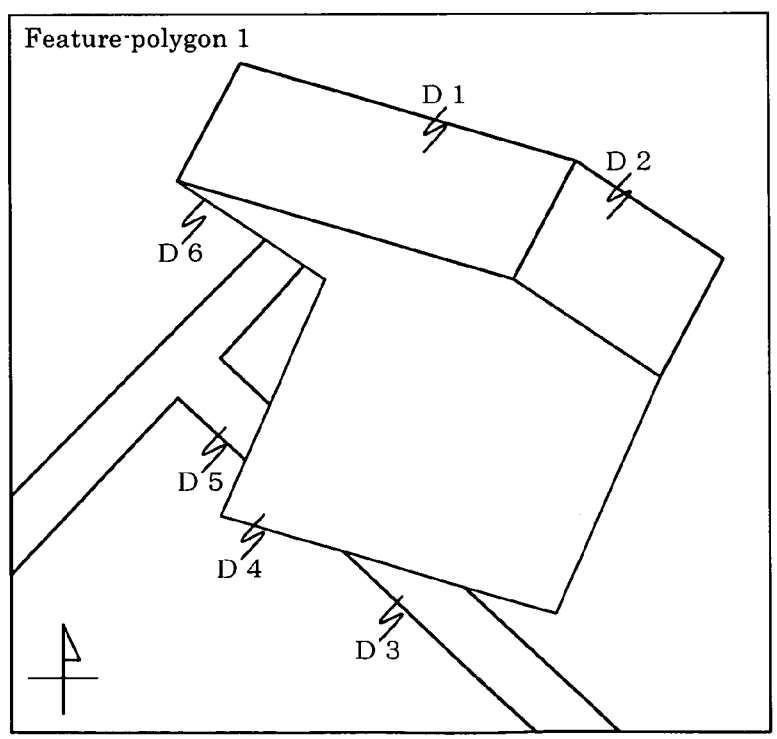

[FIG.9]
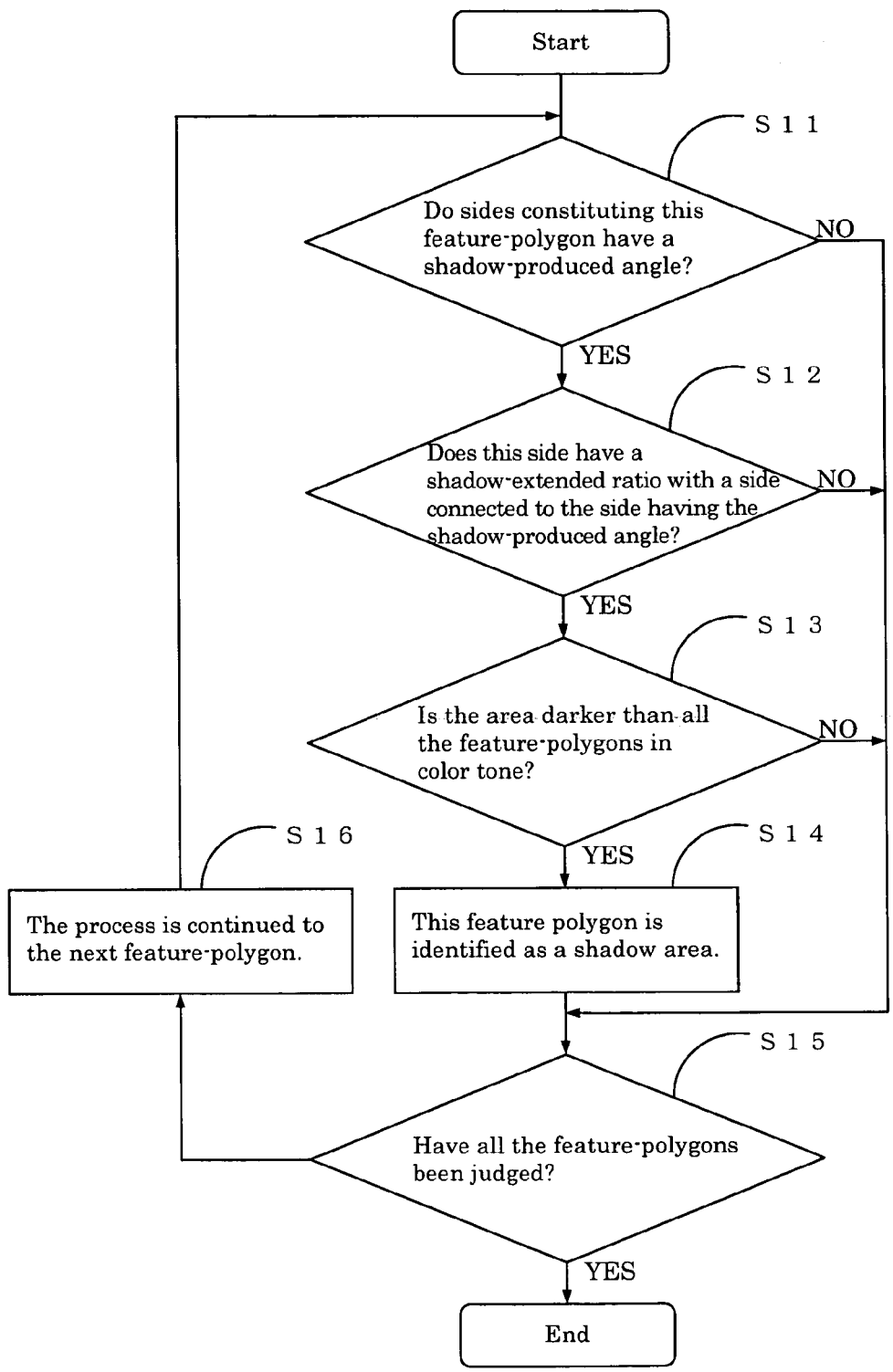

[FIG.10A]
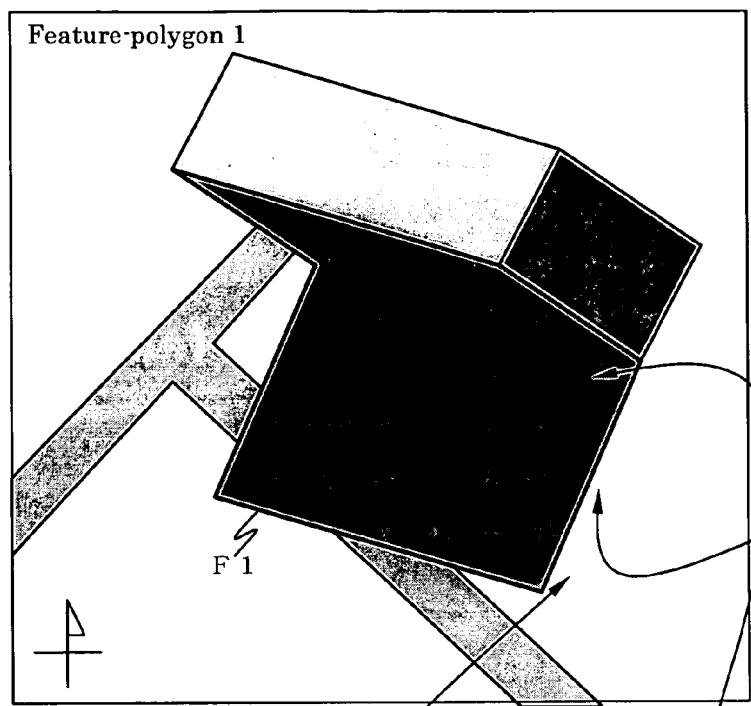
Feature-polygon 1
F1
[FIG.10B]
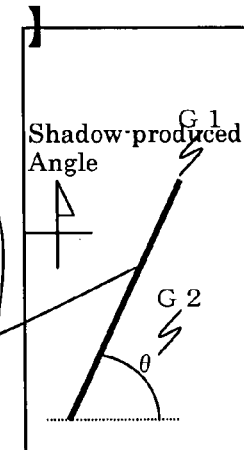
Shadow-produced Angle
G1
G2
θ
[FIG.10C]
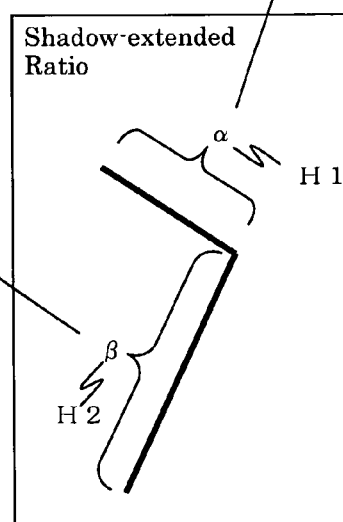
Shadow-extended Ratio
α — H1
β — H2

[FIG.11]
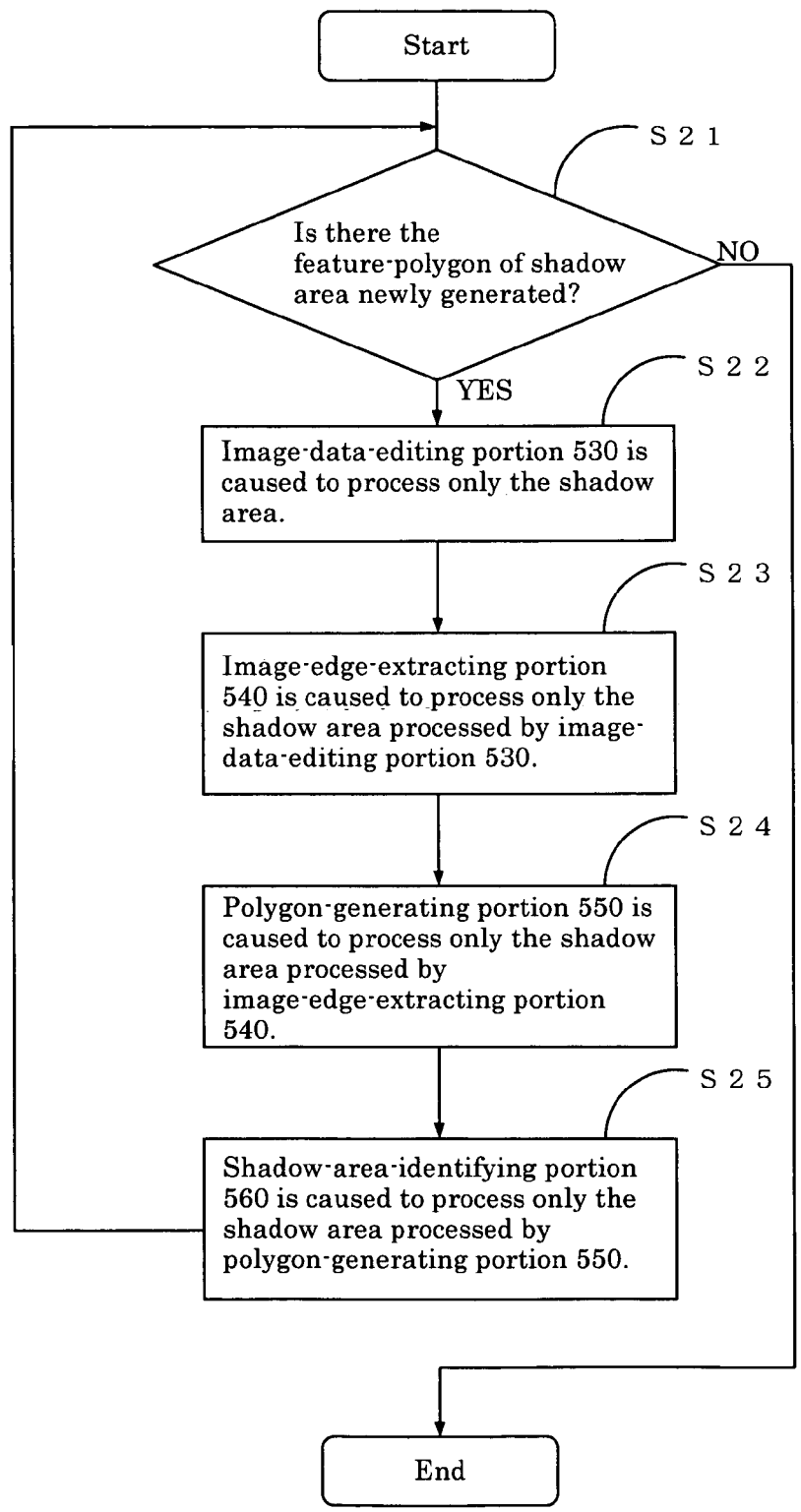

[FIG.12A]
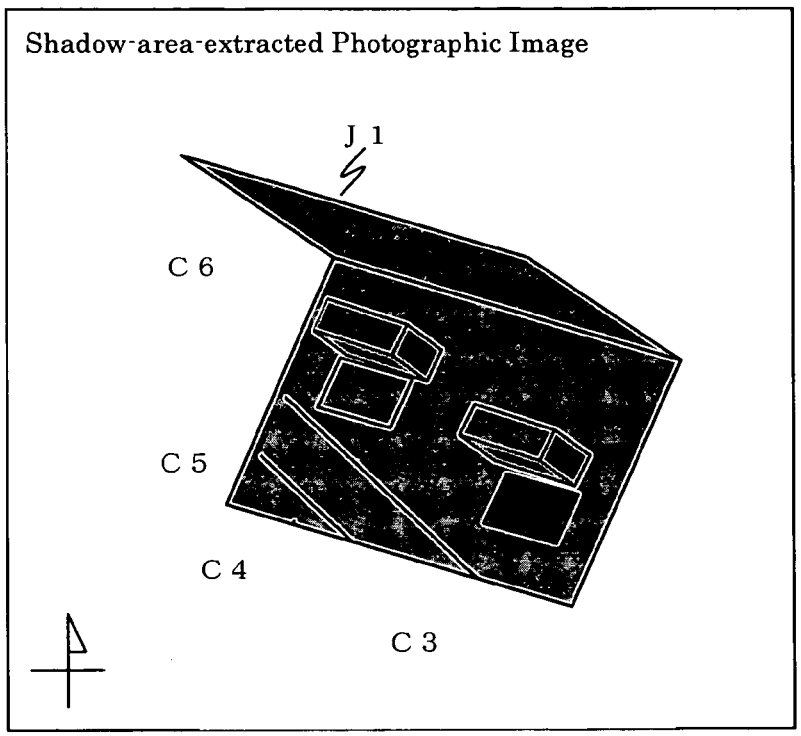
[FIG.12B]
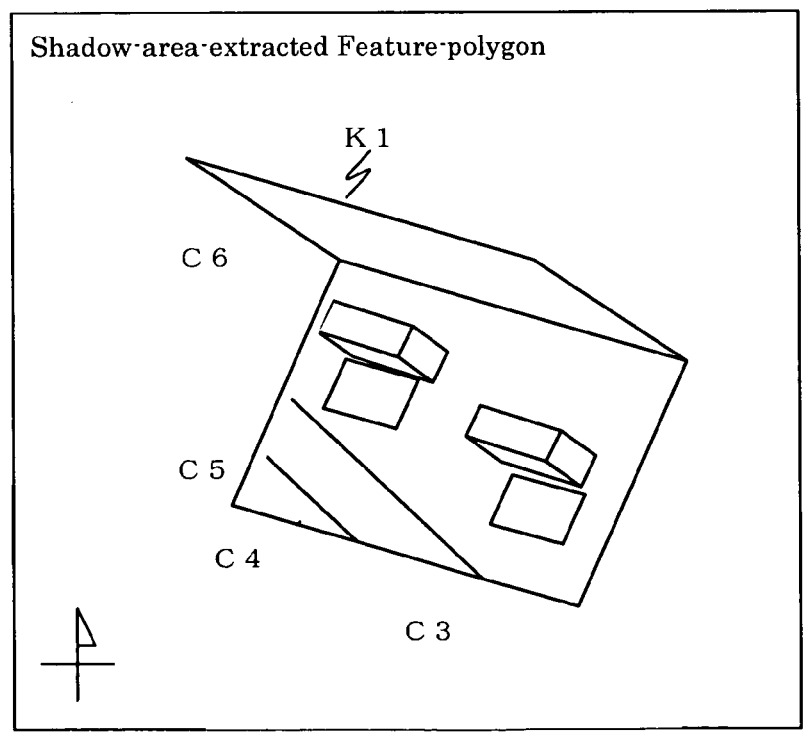

IMAGE PROCESSING SYSTEM AND IMAGE PROCESSING METHOD FOR AERIAL PHOTOGRAPH

BACKGROUND OF THE INVENTION

1. Field of the invention

The present invention relates to an image processing system and an image processing method for aerial photographs, which supports map-making by using photographic images such as aerial photographic images and satellite images and analyzing features shown in these photographic images.

2. Description of the Related Art

In recent years, there has been a tendency for the users of digital map data to increase each year because of the proliferations of car navigation devices mounted on motor vehicles and portable terminals (portable telephones particularly) equipped with a GPS function. For this reason, there has been demanded development of map-making systems, which make, at lower cost, digital map data by which the user can get clearer and more detailed data on their present position and destination, and which is more accurate, more up-to-date, and more increased in the volume of information.

Known methods include the method of making the map data based on aerial photographs. Herein, the map means a topographical-house map, road map, land-use map, land-coverage map, and electronic map for car navigation, and electronic map for a personal computer. The technology of making the above-described maps by using aerial photographs is described under the title of "Technique for Mapping" in "Computer Mapping" (by Sakauchi, Kakumoto, Ohta, and Hayshi, pressed by Shokodo Press, 1992, pp. 45-50).

The above-described conventional method has required the work of tracing the shape of a feature from the lines constituting the outline of the feature, obtained by manually projecting the image of a shadow obtained by a camera having taken a picture in a negative film. However, the advent of digital cameras, the improvement of the number of pixels, and the improvement of sensitivity sensors that detect features from the image of a digital camera have enabled the data used for making a map that is equal to or better than a negative film in the data amount, to be taken-in as digital data.

For this reason, JP-A2004-252213 discloses that features are polygonized and are taken into the database as electronic data by dividing, into line segments, the change boundary of the color information obtained by means of edge extraction from the aerial photographs taken by a high performance digital camera or satellite images.

However, in the aerial photograph or the satellite image taken with natural light, there always exists the shadow of the feature, which is a non-feature and was produced by the natural light. And the shadow is analyzed as the change boundary of the color information obtained by the edge extraction. The shadow makes it impossible to detect the accurate shape of the feature to perform the edge extraction, and the shadow interferes with the polygonization of the feature.

For this reason, JP-A11-283012 discloses that the area consisting the shadows of features is identified from the image by grouping the area of the color information obtained from the edge extraction of the shadow of non-feature, which is always produced in the aerial photograph or the satellite image taken with natural light and using the standard, obtained therefrom, that the area consisting the shadows of features is relatively darker than others.

Further, JP-A6-105224 discloses that the definition of image is increased by means of image editing, which increases the dynamic range of the image-inputting device in order to increase the resolution of the image of the shadow area. However, the method does not eliminate the shadow area from the image, and the method increases the degree of minuteness of the whole image.

As described hereinabove, in recent years, thanks to advances in the technology related to the image photographed by a digital camera and in remote-sensing technology using space satellites, which employs electric wave, light, and infrared rays, it has become possible to make map-data that detected features to high degrees of detail from aerial photographs and satellite images. In particular, an aerial photograph has become proud of its resolution of accuracy up to about 20 cm, and moreover, the improvement of ortho-correction technique has brought about the remarkable enhancement of accuracy in standard practice. Therefore, the automatic generation of the polygon data of the features from the digital image of the aerial photograph and the satellite image has become possible. For this reason, attempt has been made to always obtain the updated map data by timely detecting the change of the feature.

However, when taking aerial photographs or satellite images, which do not enable lighting apparatus to be used, the photographing has no choice but to be done with natural solar light. The improvement of the resolution of today's digital camera and of sensitivity control technique has allowed the mapping worker to visibly confirm and observe the shape of the feature in the image because of the occurrence of the change of color-tone caused by the diffused reflection of solar light on the surface of the earth and the surface of the feature also as to the shadow portion of the aerial photograph and the satellite image. However, it was not possible to automatically recognize, by mechanizing the system, the area that was not directly shined by solar light (referred to as "shadow area" hereinafter) by its being behind the feature, in the image of small difference of color gradation by means of the conventional function of detecting the shape of the feature at the wide gradation area of color, containing an area directly shined by solar light (referred to as "solar irradiation area") in the image placed on the map-data-making apparatus. For this reason, there is a problem that the shadow area in image prevents the shape of the feature from being accurately recognized from the digital image of the aerial photograph or the satellite image and the shadow area therein interferes with the automatic generation of the polygon data of the shape of the feature.

SUMMARY OF THE INVENTION

The present invention has been accomplished to solve the above-mentioned problem. An object of the present invention is to provide an image processing system for an aerial photograph and an image processing method for an aerial photograph, the system and the method being able to support the more efficient making of more accurate maps by increasing the recognition rate of the shadow area contained in the image of the aerial photograph or the equivalent.

In order to realize the above-mentioned object, the invention according to a first aspect is an image processing system for an aerial photograph, which supports map-making by use of a photographic image, wherein the image processing system includes: a shadow-angle-analyzing means that obtains the shadow-produced angle between the direction in which a shadow is extended and a predetermined direction, based on the information on the photographic image and the shadow produced from a feature shown in the photographic image; a shadow-extension-ratio-analyzing means that obtains the shadow-extended ratio, which means the ratio of the length of the shadow to the length of the feature, based on the information on the photographic image, the length of the feature, and the shadow produced from the feature shown in the photographic image; a polygon-generating means that generates a polygon by extracting the lines constituting the outline of the feature shown in the photographic image and line-connection-processing these lines; and a shadow-area-extracting means that generates the polygon of the shadow area by extracting the shadow area by use of the information on the shadow-produced angle and the shadow-extended ratio from the polygon generated by the polygon-generating means.

Further, the invention according to a second aspect is an image processing system for an aerial photograph, as set forth in the first aspect, wherein the shadow-area-extracting means includes: a shadow-angle-detecting means that detects the segments conforming to the shadow-produced angle from among the segments constituting the polygon, which was generated by the polygon-generating means; a shadow-extension-judging means that judges whether or not the segments conforming to the shadow-produced angle, which were detected by the shadow-angle-detecting means, conform to the shadow-extended ratio; and a shadow-polygon-generating means that, when the segments were found to conform to the shadow-extended ratio in consequence of the judgment made by the shadow-extension-judging means, generates the polygon of the shadow area by use of the segments conforming to the shadow-produced angle.

Sill further, the invention according to a third aspect is an image processing method for an aerial photographic, which supports map-making by use of a photographic image, wherein the image processing method includes: the step of obtaining the shadow-produced angle between the direction in which a shadow is extended and a predetermined direction, based on the information on the photographic image and the shadow produced from a feature shown in the photographic image; the step of obtaining the shadow-extended ratio, which means the ratio of the length of the shadow to the length of the feature, based on the information on the photographic image, the length of the feature, and the shadow produced from the feature, shown in the photographic image; the step of generating a polygon by extracting the lines constituting the outline of the feature shown in the photographic image and line-connection-processing these lines constituting the outline; and the step of generating the polygon of the shadow area by extracting the shadow area by use of the information on the shadow-produced angle and the shadow-extended ratio from the polygon generated by the polygon-generating means.

The image processing system for an aerial photograph and the image processing method for an aerial photograph, according to the present invention, can support the more efficient making of more accurate maps by increasing the recognition rate of the shadow area contained in the image of the aerial photograph or the equivalent.

According to the first aspect of the present invention, the shadow-angle-analyzing means obtains the shadow-produced angle between the direction in which a shadow is extended and a predetermined direction, based on the information on the photographic image and the shadow produced from a feature shown in the photographic image; the shadow analyzing means obtains the shadow-extended ratio, which means the ratio of the length of the shadow to the length of the feature, based on the information on the photographic image, the length of the feature, and the shadow produced from the feature shown in the photographic image; and the shadow-area-extracting means generates the polygon of the shadow area by extracting the shadow area by use of the information on the shadow-produced angle and the shadow-extended ratio from the polygon generated by the polygon-generating means. As a result, the image processing system for an aerial photograph can increase the recognition of the shadow area, and can thereby support the more efficient making of more accurate maps.

According to the second aspect of the present invention, the shadow-angle-detecting means detects the segments conforming to the shadow-produced angle from among the segments constituting the polygon, which was generated by the polygon-generating means; the shadow-extension-detecting means that judges whether or not the segments conforming to the shadow-produced angle, which were detected by the shadow-angle-detecting means, conform to the shadow-extended ratio; and the shadow-polygon-generating means, when the segments were found to conform to the shadow-extended ratio in consequence of the judgment made by the shadow-extension-judging means, generates the polygon of the shadow area by use of the segments conforming to the shadow-produced angle. As a result, the image processing system for an aerial photograph can generate the polygon, which accurately identified the shadow area, and can increase the recognition of the shadow area, to thereby support the more efficient making of more accurate maps.

According to the third aspect of the present invention, the steps are carried out: of obtaining the shadow-produced angle between the direction in which a shadow is extended and a predetermined direction, based on the information on the photographic image and the shadow produced from a feature shown in the photographic image; of obtaining the shadow-extended ratio, which means the ratio of the length of the shadow to the length of the feature, based on the information on the photographic image, the length of the feature, and the shadow produced from the feature, shown in the photographic image; and of generating the polygon of the shadow area by extracting the shadow area by use of the information on the shadow-produced angle and the shadow-extended ratio from the generated polygon. As a result, the image processing system for an aerial photograph can increase the recognition of the shadow area to more accurately detect the shadow area, and can thereby support the more efficient making of more accurate maps.

BRIEF DESCRIPTION OF THE DRAWINGS

FIG. 1 is an explanatory diagram showing the configuration of the aerial photographing system 100 of an image processing system for an aerial photograph according to Embodiment 1;

FIG. 2 is an explanatory table showing the shadow-information-having aerial photographic image DB of the image processing system for an aerial photograph according to Embodiment 1;

FIGS. 3A-3F are explanatory diagrams showing the shadow-produced angle, of the image processing system for an aerial photograph according to Embodiment 1;

FIGS. 4A and 4B are explanatory diagrams showing the shadow-extended ratio, of the image processing system for an aerial photograph according to Embodiment 1;

FIGS. 5A-5C are explanatory diagrams showing the shadow-produced angle and the shadow-extended ratio, of the image processing system for an aerial photograph according to Embodiment 1;

FIG. 6 is an explanatory diagram showing the configuration of the feature-polygon-generating system of the image processing system for an aerial photograph according to Embodiment 1;

FIGS. 7A-7C are explanatory diagrams showing the shadow-information-not-having aerial photographic image DB, the shadow information parameter, and the feature polygon DB, respectively, of the image processing system for an aerial photograph according to Embodiment 1;

FIGS. 8A and 8B are explanatory diagrams showing the polygon-of-feature generating process, of the image processing system for an aerial photograph according to Embodiment 1;

FIG. 9 is a flowchart showing the shadow-area-identifying process of the image processing system for an aerial photograph according to Embodiment 1;

FIGS. 10A-10C are flowcharts showing the process of judging the shadow-produced angle and the shadow-extended ratio, of the image processing system for an aerial photograph according to Embodiment 1;

FIG. 11 is a flowchart showing the polygon-generating-process of a shadow area, of the image processing system for an aerial photograph according to Embodiment 1; and FIGS. 12A and 12B are explanatory diagrams showing the polygon-generating process of a shadow area, of the image processing system for an aerial photograph according to Embodiment 1.

DETAILED DESCRIPTION OF THE PREFERRED EMBODIMENT

Embodiment 1

Embodiment 1 to embody an image processing system for an aerial photograph according to the present invention will now be described as below. The image processing system for an aerial photograph according to this Embodiment includes: an aerial photographing system 100 having the nature-shadow-discriminating-information-collecting function of generating the data used for supporting the generation of the polygons of features by analyzing information on the shadows produced from the features shown in an image, based on information on the image, obtained from images such as aerial photographs or satellite images; and a feature-polygon-generating system 500 that generates the polygons of the features, which contribute to database supporting the making of accurate maps.

FIG. 1 is an explanatory diagram showing the configuration of the aerial photographing system 100 included in the image processing systems for an aerial photographic image according to Embodiment 1, the aerial photographing system 100 having the function of collecting information discriminating the shadows from nature. The aerial photographing system 100 includes: a photographing portion 110, which takes information on image data from photographing means such as a digital camera having taken aerial photographs; a photographing central control portion 120, which carries out processes based on image data such as the aerial photographs taken by the photographing portion 110; and a shadow information analyzing portion 130, which generates data used for supporting the generation of the polygons of features, based on information on image data such as aerial photographs and the shadows produced from the features, shown in the image data. Moreover, to the exterior of the aerial photographing system 100, is connected a shadow-information-having aerial photographic image DB 200 recording the data used for supporting the generation of the polygon of the feature, processed by the photographing central control portion 120 and the image data such as aerial photographs.

The aerial photographing system 100 is composed of: and is operated by: common personal computers, for example, in which programs are installed, used for operating and controlling functional blocks each having an elemental function, such as the above-described photographing portion 110, photographing central control portion 120, and shadow information analyzing portion 130; and a CPU controlling each of the functions. The shadow-information-having aerial photographic image DB 200 may be arranged to be connected to the exterior of the aerial photographing system 100 such that information can be sent and received. Or the shadow-information-having aerial photographic image DB 200 may be arranged to be connected to a server through the communication network of the Internet, for example, for recording information online, or may be arranged such that storage media such as CD-ROMs record information. Further, these elemental functional blocks are built in software in this Embodiment 1 by the CPUs of personal computers executing the computer program; however, these elemental functional blocks can be built in hardware by using apparatuses having the respective functional blocks equipped.

The photographing portion 110 has the functions of: recording and taking in imager data such as aerial photographs through the image pickup elements of a charge coupled device (charge coupled diode) and the photoreceptor of a camera file from photographing means such as digital cameras having taken the aerial photographs, which is connected to outside; and at the same time, recording and taking in photographing information on the image data such as these aerial photographs. Herein, this photographing information includes the photographing date, the latitude longitude information of photographing location, photographing range, photographing azimuth direction, photographing altitude, the photographing angle of the camera, and the field angle of the lens.

The photographing central control portion 120 has the functions of: controlling the photographing portion 110 and the shadow information analyzing portion 130; digitalizing the image data and photographing information obtained from the photographing portion 110; and digitalizing the data obtained from the shadow information analyzing portion 130 to store the data in the shadow-information-having aerial photographic image DB 200.

The shadow information analyzing portion 130 has the functions of: calculating the solar orientation and the sun elevation based on the photographing date, the latitude longitude information of the photographing location, included in the photographing information; executing a process further about the shadow produced from the feature, shown in the image such as the aerial photograph or the equivalent based on information such as the photographing azimuth direction, the photographing altitude, and the photographing angle of the camera, included in the photographing information; and analyzing the shadow information including the shadow-produced angle between the direction in which the shadow is extended and a predetermined direction, and the shadow-extended ratio, which shows the ratio of the length of the shadow to the length of the feature.

Herein, the shadow information means information on a shadow that was produced and extended in the direction opposite the direction in which the feature received solar light, shown in the image photographed by an aerial photograph and particularly information including the shadow-produced angle and the shadow-extended ratio.

The shadow-produced angle is the angle showing the azimuth direction to which a shadow is produced and extended from a feature shown in the image of the aerial photograph according to the photographing method of taking the aerial photograph and is basically the azimuthal angle showing the direction opposite the azimuth direction where the sun exists. FIG. 3 is an explanatory diagram showing the photographing method with which an aerial photograph was taken, a photographed image, and the shadow-produced angle of a shadow that was produced from a feature. As shown in FIGS. 3A and 3B, in photographing methods 1 and 2, the shadows that were produced and extended from features 11 and 21 shone by solar lights 12 and 22 at the same date, are influenced by the conditions such as the photographing location, the photographing azimuth direction, the photographing angle of the camera, the photographing altitude, and the field angle of the lens in the photographing methods 1 and 2, as shown in FIGS. 3C and 3D, and the azimuths direction where the shadows expand are determined in the respective photographing method 1 and 2. Therefore, the shadow-produced angles are the angles at which the shadows were produced from the features shown in the image of an aerial photograph, and as shown in FIGS. 3C and 3D, are angles $\theta 51$ and $\theta 61$ formed between the east-west direction lines 53 and 63 that each extends in eastern and western directions as viewed in the images and the directions where the shadows 52 and 62 produced from the features extend, respectively. The shadow information analyzing portion 130 determines the azimuth direction where the shadow expands, based on information on the conditions such as the photographing position, the photographing azimuth direction, the photographing angle of the camera, the photographing altitude, and the field angle of the lens, and analyzes and calculates the shadow-produced angle from this determined azimuth direction of the shadow and the east-west direction line The shadow-extended ratio is a ratio showing how much the shadow produced from the feature has been extended with respect to the height (length), from the ground plane, of the feature viewed in the image, and is basically proportional to the sun elevation. FIGS. 4A and 4B are explanatory diagrams each showing the feature photographed in an image such as an aerial photograph, and how the shadow is produced from the feature. As shown in FIGS. 4A and 4B, influenced by the conditions such as the photographing location, the photographing azimuth direction, the photographing angle of the camera, the photographing altitude, and the field angle of the lens in the photographing method shown in the photographic images 3 and 4, the ratios of length of the shadows, which are produced and extended from the features in the azimuth directions of the shadow-produced angles, with respect to the heights of the features from the ground plane, are determined in the photographic images 3 and 4, respectively. Accordingly, the shadow-extended ratio is the ratio of the length of the shadow produced and extended from the feature to the length of the feature as viewed in the image of the aerial photograph. And as shown in FIGS. 4A and 4B, about shadows 74 and 84 produced from respective towers 73 and 83, the shadow-extended ratio is the ratio $\beta/\alpha$ of the lengths $\beta 72$ and $\beta 82$, shown in the image, of the shadows 74 and 84 extending at the azimuthal angles of the produced shadows to the lengths $\alpha 71$ and $\alpha 81$ shown in the image, showing the heights of towers 73 and 83 from the ground plane. The shadow information analyzing portion 130 analyzes and calculates the ratio of the length of the shadow extended from the feature in the azimuth direction of the shadow-produced angel, to the length of the feature, to thereby determine the shadow-extended ratio, based on information on the conditions such as the photographing location, the photographing azimuth direction, the photographing angle of the camera, the photographing altitude, and the field angle of the lens.

The solar orientation and the sun elevation are the redundant data calculated based on the photographing date and the latitude longitude information of the photographing location, included in the photographing information.

Further, the shadow information analyzing portion 130 may analyze the shadow-produced angle and the shadow-extended ratio, as follows. FIGS. 5A-5C are explanatory diagrams showing the method of performing the analysis from the feature photographed in an image such as an aerial photograph and the shadow produced from the feature, by using a method other than the above-described method. As shown in FIG. 5B, information on the shape of a standard-sized feature having a specific shape, such as an iron tower used for supplying power or a utility pole are previously registered as a marker pattern. Then, the shadow-extended ratio may be detected: by automatically recognizing and detecting a feature and a shadow corresponding to this marker pattern from the image of photographic image 5, as shown in FIG. 5A; and by analyzing the shadow-extended ratio from this detected feature B4, the angle $\theta B1$ obtained from the shadow B5 produced from the feature B4 and the east-west direction line; in other words, by analyzing the shadow-produced angle, the length $\alpha B2$ of the feature B4, and the length $\beta B3$ of the shadow B5, as shown in FIG. 5C.

FIG. 2 is an explanatory table showing the configuration of the shadow-information-having aerial photographic image DB 200. The shadow-information-having aerial photographic image DB 200 stores and associates, with each other: the photographing date 212 showing the date when the photographing was performed with respect to the image number 211 used for identifying every scene of the image data of the aerial photographs; the latitude longitude information 213 of the photographed location, showing the location at which the photographing was performed; the photographed range 214 showing the range, which was photographed in the image; the photographing azimuth direction 215 showing the azimuth direction in which the photographing was performed; the photographing altitude 216 showing the altitude of the location at which the photographing was performed; the photographing angle of the camera showing the angle of the camera 217 having done the photographing; the field angle of the lens 218 of the camera; the amount of sunlight 219 of solar light at the photographing time; the solar orientation 220 obtained from the analysis performed by the shadow information analyzing portion 130; the sun elevation 221; the shadow-produced angle 222; the shadow-extended ratio 223; and the image data 224 of the aerial photographs.

FIG. 6 is an explanatory diagram explaining the configuration of the feature-polygon-generating system 500. The feature-polygon-generating system 500 includes: the central control portion 510 that controls the operations of functional blocks each having an elemental function installed within this feature-polygon-generating system 500; the image-information-input portion 520 that reads out and inputs the data of image stored in the shadow-information-having aerial photographic image DB 200; the image-data-editing portion 530 that edits the color tone of the image inputted by the image-information-input portion 520; the image-edge-extracting portion 540 that performs the process of extracting the image edges, which are the lines constituting the outline of the feature shown in the image; the polygon-generating portion 550 that performs the process of generating the polygon of feature by using the image edges that were extracted by the image-edge-extracting portion 540; and the shadow-areaidentifying portion 560 that performs the process for identifying the shadow area as the portion becoming the shadow produced from the feature based on the data of the polygon, which was generated by the polygon-generating portion 550. To the exterior of the feature-polygon-generating system 500, are connected: the shadow-information-having aerial photographic image DB 200; the shadow-information-not-having aerial photographic image DB 300 that stores a variety of data concerning the image that does not include shadow information and the image data of the aerial photograph; the shadow-information parameter 400 that temporarily stores the shadow information of the image, which was inputted by the image-information-input portion 520; and the feature-polygon DB 600 that stores the data of the polygon of the feature, which was generated by the feature-polygon-generating system 500.

The feature-polygon-generating system 500 is composed of: and is operated by: common personal computers, for example, in which programs are installed, used for operating and controlling functional blocks each having an elemental function, such as the above-described central control portion 510, the image-information-input portion 520, the image-data-editing portion 530, the image-edge-extracting portion 540, the polygon-generating portion 550, and the shadow-area-identifying portion 560; and a CPU controlling each of the functions. The shadow-information-having aerial photographic image DB 200, shadow-information-not-having aerial photographic image DB 300, shadow-information parameter 400, and feature-polygon DB 600 maybe connected to the exterior of the feature-polygon-generating system 500 such that information can be sent and received. Or the shadow-information-having aerial photographic image DB 200 may be arranged by being connected with a server through the communication network of the Internet, for example, to record information online, or may be arranged by storage media such as CD-ROMs recording information. Further, functional blocks each having an elemental function are arranged in software, in this Embodiment 1, by the CPUs of personal computers executing the computer programs; however, these functional blocks can be arranged in hardware by using apparatuses having the respective functional blocks equipped therein.

The image-information-input portion 520 has the function of reading out information such as the data of image 224 stored in the shadow-information-having aerial photographic image DB 200, the shadow-produced angle 222 and the shadow-extended ratio 223 related to this data of image 224, and the function of inputting this information to the feature-polygon-generating system 500. Moreover, in response to the input performed by use of not-shown operation means, of information such as the data of image 617, which was stored in the shadow-information-not-having aerial photographic image DB 300 and which will be described later herein, the shadow-produced angle, and the shadow-extended ratio, which were measured and calculated from the image by the operator by using a predetermined tool, as shown in FIG. 5C, the image-information-input portion 520 has the function of storing the above-described information in the shadow-information parameter 400 as the shadow-produced angle 621 and the shadow-extended ratio 622 and the function of inputting the information together with the data of image 617 in the feature-polygon-generating system 500.

The image-data-editing portion 530 has the function of editing the color tone of the image of the aerial photograph, which was inputted by the image-information-input portion 520, by changing the color tone of the boundary of color-tone-change of the image such that the lines constituting the outline, for example, of the feature as viewed in the image can be easily detected. The image-data-editing portion 530 has the function of performing a general image-transformation, which is most suitable for the polygon-generation process carried out by extracting the image edge from the image, by means of performing gradation transformation or color-tone transformation chiefly as the shading transformation of each pixel in the image, and shading transformation based on the area existing in the boundary of color-tone-change of the image, in other words, by means of carrying out the process of sharpening or the process of smoothing the feature in the image as spatial filtering.

The image-edge-extracting portion 540 has the function of detecting the image edge by performing the difference operation processing of the image of the aerial photograph and the function of processing the noise component produced from the above processing by using a Sobel filter or a Prewitt filter to reduce or eliminate the noise thereof.

The polygon-generating portion 550 has the function of generating the polygon of the feature by performing the line-connecting process of the segments of the image edge component, which was extracted by the image-edge-extracting portion 540, and polygonizing the segments. For example, the disconnected portion of the segments of the image edge is grouped and thereby is line-connected to perform polygonization.

Further, the polygon-generating portion 550 is arranged to judge that the shadow of a person or a tree, for example, which happened to be photographed in the aerial photograph is not the object to be shown in the map, such as a building or the equivalent, and delete the polygon thereof when the range showing the size of the generated polygon is smaller than the minimum rectangular size, which was previously defined, and further, when the amplitude of fluctuation of the boundary portion of the segments constituting the image edge is smaller than that of the previously defined value.

FIGS. 8A and 8B are explanatory diagrams showing the example in which the polygon-generating portion 550 generated a polygon from a feature shown in the image. FIGS. 8A and 8B shows how the feature polygon-generating portion 550 extracted the image edge from the photographic image 6 shown in FIG. 8A, the image-edge-extracting portion 540 extracted the image edge, which is composed of the lines constituting the outline of the feature, from the boundary of the color-tone change in the image shown in FIG. 8A, and the feature-polygon-generating portion 550 generated the feature-polygon 1 as shown in FIG. 8B by performing the line-connecting process of the segments of this image edge. Additionally, in this example of the generation of polygon, as shown in FIG. 8A, influenced by the condition of insufficient light quantity when photographing the feature, the shadow area C4 that is the shadow of the feature and the feature area C6 were judged as being of the same density because the gradient of density difference, used for distinguishing the solar-irradiated area from the shadow area to extract the image edge, did not expand, though the shadow area C4 and the feature area C6 underwent the edit processing performed by the image-data-editing portion 530. As shown in FIG. 8B, the shadow area C4 and the feature area C6 were shown as one feature polygon.

The shadow-area-identifying portion 560 has the function of carrying out the processing of the data of the polygon, which was generated by the feature-polygon-generating portion 550, and the functions of identifying and extracting the shadow area, which is the shadow portion produced from the feature by using information such as the shadow-produced angles 222, 621 and the shadow-extended ratios 223, 622, of the features.

FIG. 7A is an explanatory diagram showing the configuration of the shadow-information-not-having aerial photographic image DB 300. FIG. 7B is an explanatory diagram showing the configuration of the shadow information parameter 400. FIG. 7C is an explanatory diagram showing the configuration of the feature polygon DB 600. The shadow-information-not-having aerial photographic image DB 300 stores and associates, with each other: the photographing date 612 showing the date when the photographing was performed with respect to the image number 611 used for identifying every scene of the image data of the aerial photographs; the latitude longitude information 613 of the photographed location, showing the location at which the photographing was performed; the photographed range 614 showing the range, which was photographed in the image; the photographing azimuth direction 615 showing the azimuth direction in which the photographing was performed; the photographing altitude 616 showing the altitude of the location at which the photographing was performed; and the image data 617 of the aerial photographs.

The shadow-information parameter 400 temporarily stores the shadow-produced angle 621 and the shadow-extended ratio 622, in association with the image number 611, as the shadow information of the image, which was inputted by the image-information-input portion 520. The feature-polygon DB 600 stores and associated, with each other: the photographing date 632 showing the date when the photographing was performed, with respect to the image number 631 corresponding to the image numbers 211, 611 used for identifying the image data, to which the feature-polygon-generating portion 550 performed the process of polygon generation; the latitude longitude information 633 of the photographed location, showing the location at which the photographing was performed; the number of polygon 634 showing the number of polygons included in the image; and the data of polygon 635 including the data such as a coordinate point related to each of the polygons of features such as roads, rivers, lakes, and buildings, which were generated in the image.

Subsequently, the operation of the image processing system for an aerial photograph according to this Embodiment 1 will now be described in detail in reference to the flowchart shown in FIG. 9 and FIG. 11. First of all, the process for identifying the shadow area from the polygon generated by the polygon-generating portion 550 in the feature-polygon-generating system 500 will be described by using the flowchart shown in FIG. 9. The central control portion 510 of the feature-polygon-generating system 500 performs the process of judging, by using the shadow-area-identifying portion 560, whether or not the segments constituting the feature-polygon shown in the image conform to the shadow-produced angle (step S11).

The central control portion 510 reads out the data of polygon 635 stored in the feature-polygon DB 600 and the image number 631 related thereto, retrieves the shadow-information-having aerial photographic image DB 200 or the shadow-information parameter 620 based on this image number 631, and reads out the shadow-produced angle 222 or 621 and the shadow-extended ratio 223 or 622, related to the image numbers 211, 611 corresponding to the image number 631. Then, the central control portion 510 performs the process of judging whether or not there are segments conforming to the shadow-produced angle of the segments constituting the polygon, by comparing the shadow-produced angle with the angles of segments, shown in the image, constituting the polygon generated by the polygon-generating portion 550 in reference to information on the shadow-produced angle 222 or 621. For example, in the example of the feature-polygon shown in FIG. 10A, an judgment is made on whether or not there is the segment constituting the polygon F1, viewed in the image, shown in FIG. 10A, which conforms to the segment G1 forming the shadow-produced angle, shown in FIG. 10B in angle. When there is not the segment therein (No in step S11), the process of step S15 is executed.

Then, the central control portion 510, when there is the segment conforming to the shadow-produced angle (YES in step S11), performs the process of judging whether or not the ratio of the length of the segment conforming to the shadow-produced angle to the length of the segment of the feature coincides with the shadow-extended ratio (step S12). The central control portion 51 carries out the process of calculating the shadow-extended ratio $\beta/\alpha$ by use of the length $\beta$, in image, of the segment of the portion forming the shadow, which conforms to the shadow-produced angle and the length $\alpha$, in image, of the segment connected with this segment of the portion forming the shadow, by referring to information on the shadow-extended ratio 223 or 622, and the process of judging whether or not this numerical value $\beta/\alpha$ coincides with the shadow-extended ratio 223 or 622. For example, in the example of the feature-polygon shown in FIG. 10A, a judgment is made on whether or not the shadow-extended ratio, obtained from the length $\beta$ of the segment constituting the shadow, which conforms to the shadow-produced angle shown in the image shown in FIG. 10A and the length $\alpha$ of the segment of the polygon F1, connected with the above segment, coincides with the shadow-extended ratio, obtained from the segment H1 and the segment H2, shown in FIG. 10C. When these shadow-extended ratios do not coincide with each other (NO in step S12), the process of step S15 is executed.

Subsequently, the central control portion 510, when these shadow-extended ratios coincide with each other (YES in step S11), judges whether or not the color tone of the area surrounded by the segments constituting the shadow is darker than the color tones of all the polygons adjacent to this area (step S13). The processes are performed, of detecting the color tone of the area surrounded by the segments constituting the shadow and the color tones of all the polygons adjacent to this area, and of judging whether or not the color tone of this area surrounded by the segments is darker than the color tones of all the adjacent polygons. For example, in the example of the feature-polygon shown in FIG. 10A, the processes are performed, of detecting the color tone of the area surrounded by the segments constituting the shadow, which conforms to the shadow-produced angle shown in the image shown in FIG. 10A, and the color tones of all the polygons adjacent to this area, and of judging whether or not the color tone of this area is darker than the color tones of all the adjacent polygons. When the color tone thereof is not darker (NO in step S13), the process of step S15 is executed.

After that, the central control portion 510, when the color tone thereof is darker than that (YES in step S13), identifies the area surrounded by the segments constituting the shadow area as "shadow area" (step S14), and judges whether or not the process has been performed with respect to the data of all of the polygons stored in the feature-polygon DB 600 (step S15). When the process has been performed with respect to the data of all of the polygons (YES in step S15), the processing is finished.

When the process has never been performed with respect to the data of all of the polygons (NO in step S15), the process of incrementing the image number 631 related to the polygon data 635, which has undergone the above process is carried out, to repeatedly execute the process following the step S11 with respect to other polygon data 635.

Subsequently, the process for generating the polygon of the shadow area identified by the above-described process in the feature-polygon-generating system 500 will be described by using the flowchart shown in FIG. 11. First of all, the central control portion 510 of the feature-polygon-generating system 500 carries out the process of judging whether or not the data of the shadow area identified by the process for identifying the shadow area exists (step S21). The process of judging whether or not the data of the shadow exists is carried out by retrieving the feature-polygon DB 600. When the data does not exist therein (NO in step S12), the process is finished.

Next, the central control portion 510, when the data of the shadow area exists (YES in step S21), performs the process of editing the color tone about the shadow area in image, by the image-data-editing portion 530 (step S22). The central control portion 510 carries out the process of editing the tone color such that the image-edge-extracting portion 540 can easily detect the lines constituting the outline of the shadow area based on the change of the color tone, by changing the color tone of the boundary of the shadow area or the like, for example. For example, in the example of the shadow area shown in FIG. 12A and FIG. 12B, the central control portion performs the process of changing the color tone thereof such that the internal portion of the shadow area J1 and the external portion thereof each have a different color tone to each other, about the boundary of the shadow area J1 in image shown in FIG. 12A.

Subsequently, the central control portion 510 performs the process of extracting the image edge of the shadow area (step S23) by processing the difference operation in image by use of the image-edge-extracting portion 540, and reducing and eliminating the noise of the lines constituting the outline portion of the shadow area.

Then, the central control portion 510 performs the process of line-connecting the segment of the image edge component of the shadow area by the polygon-generating portion 550, and performing the process of generating the polygon of the shadow area (step S24). For example, in the example of the shadow area shown in FIG. 12A and FIG. 12B, the central control portion 510 performs the process of line-connecting the segments and thereby generating the polygon by grouping, expanding, and joining the disconnected portion of the segments of the image edge component of the shadow area J1 in image shown in FIG. 12A.

After that, the central control portion 510 carries out the process of storing the generated polygon of the shadow area in the feature-polygon DB 600 by causing the data of polygon 635 to include the generated polygon in association with the image number 631 of the image where this shadow area exists by use of the shadow-area-identifying portion 560 (step S25). Then, the process following the step S21 is repeatedly executed.

As mentioned hereinabove, in the image processing system for an aerial photograph according to this Embodiment 1, the central control portion 510 compares the shadow-produced angle with the angle, in image, of each of segments constituting the polygon generated by the polygon-generating portion 550; judges whether or not there is the segment conforming to the shadow-produced angle in the segments constituting the polygon; judges whether or not the ratio of the length of the segment of the shadow to the length of the segment of the feature coincides with the shadow-extended ratio; performs the process of judging whether or not the color tone of the area surrounded by the segments constituting the shadow is darker than that of all the adjacent polygons; and identifies the area surrounded by the segments constituting the shadow area as "shadow area" based on the result of the above processes. Further, the process of generating the polygon of the identified shadow area is performed.

Thus, because the image processing system for an aerial photograph according to this Embodiment 1 has made it possible to perform the polygonization by means of extracting the image edge from the image of an aerial photograph, in which the shadow area, which could not detected, was optimized, it has become possible to increase the degree of the accuracy and the efficiency of the automatic generation of the polygon data of the features from the image of the aerial photograph and the satellite image. When making a map by using the image data of the aerial photograph or the equivalent, it has become possible to support the more efficient making of more accurate maps by recognizing the portion of the shadow area, which has been more clearly shown by the polygon of the shadow area, and preventing the shadow area from being improperly shown in the map. It has become possible to increase the recognition rate of the shadow area included in the image of the aerial photograph, and thereby support the more efficient making of more accurate maps.

Embodiment 2

In Embodiment 1 above described, a judgment was made on whether or not the color tone of the area surrounded by the segments constituting the shadow is darker than that of all the polygons adjacent thereto in step S13; however, the present invention is not so limited. It maybe arranged that a judgment be made about whether or not the color tone of the surrounded area is still darker, and at the same time a judgment be made on whether or not the color of the area surrounded by the segments constituting the shadow is black. Such a process enables a judgment whether or not the area is a shadow area to be more accurately made.

What is claimed is:

1. An image processing system for an aerial photograph, which supports map-making by use of a photographic image, the image processing system comprising:

a shadow-angle-analyzing processing unit that obtains a shadow-produced angle between a direction in which a shadow is extended and an east-west direction line, based on information of the photographic image and a shadow produced from a feature shown in the photographic image;

a shadow-extension-ratio-analyzing processing unit that obtains a shadow-extended ratio, which is a ratio between a length of the shadow produced from the feature and a height of the feature, based on information of the photographic image, the length of the feature, and the shadow produced from the feature shown in the photographic image;

a polygon-generating portion that generates a polygon by extracting lines constituting an outline of the feature shown in the photographic image and line-connection-processing these lines; and a shadow-area-extracting portion that generates a polygon of a shadow area by extracting the shadow area based on at least information on the shadow-produced angle and the shadow-extended ratio from the polygon generated by the polygon-generating portion;

wherein the shadow-angle-analyzing processing unit, the shadow-extension-ratio-analyzing processing unit, the polygon-generating portion and the shadow-area-extracting portion are each implemented as hardware or a hardware/software combination.

2. An image processing system for an aerial photograph according to claim 1, wherein the shadow-area-extracting portion comprises:
a shadow-angle-detecting portion that detects the segments conforming to the shadow-produced angle from among the angles constituting the polygon, which was generated by the polygon-generating portion;
a shadow-extension-judging portion that judges whether or not the segments conforming to the shadow-produced angle, which were detected by the shadow-angle-detecting portion, conform to the shadow-extended ratio; and
a shadow-polygon-generating portion that, when the segments were found to conform to the shadow-extended ratio in consequence of the judgment made by the shadow-extension-judging portion, generates the polygon of the shadow area by use of the segments conforming to the shadow-produced angle.

3. An image processing method for an aerial photograph, which supports map-making by use of a photographic image, the image processing method comprising:
obtaining a shadow-produced angle between a direction in which a shadow is extended and a predetermined direction, based on information of the photographic image and the shadow produced from a feature shown in the photographic image;
obtaining the shadow-extended ratio, which is a ratio between a length of the shadow produced from the feature and a height of the feature, based on information of the photographic image, the length of the feature, and the shadow produced from the feature, shown in the photographic image;
generating a polygon by extracting lines constituting an outline of the feature shown in the photographic image and line-connection-processing these lines; and
generating a polygon of a shadow area by extracting the shadow area via at least the information on a shadow-produced angle and the shadow-extended ratio from the polygon generated.

4. The method of claim 3, wherein said predetermined direction is an east-west direction line.

* * * * *